United States Patent [19]

Ojakaar

[11] 4,259,227

[45] Mar. 31, 1981

[54] POLYURETHANE COMPOSITIONS FOR TIRE SIDEWALLS AND COMPOSITE ARTICLES

[75] Inventor: Leo Ojakaar, Hockessin, Del.

[73] Assignee: E. I. Du Pont de Nemours and Company, Wilmington, Del.

[21] Appl. No.: 77,716

[22] Filed: Sep. 21, 1979

[51] Int. Cl.³ .............................................. C08G 18/38
[52] U.S. Cl. ............................ 260/37 N; 152/330 R; 152/353 R; 156/116; 528/73
[58] Field of Search ...................... 260/37 N; 528/73; 152/330 R, 353 R; 156/116

[56] References Cited

U.S. PATENT DOCUMENTS

| | | | |
|---|---|---|---|
| 3,555,115 | 1/1971 | Bottomley et al. | 260/45.9 |
| 3,648,748 | 3/1972 | Lovell | 152/353 |
| 4,038,256 | 7/1977 | Finelli et al. | 428/425 |
| 4,102,870 | 7/1978 | Hofmann et al. | 528/73 |

*Primary Examiner*—Maurice J. Welsh

[57] ABSTRACT

White and colored tire sidewalls are made by fabricating a tire having a concentric groove on at least one sidewall and, after cleaning the groove and coating it with adhesive, filling the groove with a polyurethane composition based on 4,4'-methylenebis(cyclohexyl isocyanate) and one or more polyols, said composition also containing an adduct of an aliphatic diisocyanate with N-(t-butyl)diethanolamine and bis(2,2',6,6'-tetramethyl-4-piperidine) sebacate, then curing the composition at an elevated temperature. Pigmented sidewalls of this invention have high light and weather resistance and an exceptional resistance to contact staining.

14 Claims, No Drawings

POLYURETHANE COMPOSITIONS FOR TIRE SIDEWALLS AND COMPOSITE ARTICLES

BACKGROUND OF THE INVENTION

This invention relates to novel polyurethane compositions which can be used in forming composite rubber-polyurethane articles with a variety of hydrocarbon rubbers, neoprene, polyurethanes, and other elastomers.

A commonplace situation where one type of elastomer is laminated to another is the application of white sidewalls to automobile tires. Other possible applications include, for example, manufacture of multilayer hoses, industrial belts, covered rolls, and all manner of inflatable articles. The outermost elastomeric layer normally is required to have good mechanical properties, light and weather stability, and frequently also stain resistance. Thus, for example, white tire sidewalls should not be easily stained by contact with another tire or with a curb and should resist light and weather degradation at least to the same extent as the main body of the tire. Various means of achieving this goal have been proposed and put into practice in the past with varying degrees of success. There is, however, a continuing need for further improvement.

SUMMARY OF THE INVENTION

According to the present invention, there is provided a composition consisting essentially of a polyurethane derived from 4,4'-methylenebis(cyclohexyl isocyanate), an adduct of 2 moles of N-(t-butyl) diethanolamine with 1 mole of an aliphatic diisocyanate, and bis(2,2',6,6'-tetramethyl-4-piperidine) sebacate.

As a specific embodiment of the present invention, there is provided a polyurethane composition according to the above description containing a pigment, which composition is suitable in forming pigmented sidewalls for automobile tires, and a method of applying said pigmented composition to tires having a preformed circular groove in one of their walls suited to receive said composition.

DETAILED DESCRIPTION OF THE INVENTION

Definition.

The term "consisting essentially", as used throughout this disclosure, including the claims, is meant to include, in addition to the specifically recited chemical compounds, also minor amounts of other additives which do not adversely affect the operability of the compositions containing those ingredients in their various intended uses.

The polyurethane component of the compositions of the present invention, derived from 4,4'-methylenebis(-cyclohexyl isocyanate), is made in a well known manner from the bis(isocyanate), and one or more polyols in such proportions that the total amounts of isocyanate and hydroxyl functionalities are about equal. It will be practical for the purpose of this disclosure to call the bis(isocyanate) PICM, as it has been called traditionally because of its earlier name, p,p'-isocyanatocyclohexylmethane. PICM is available commercially from E. I. du Pont de Nemours and Company, Wilmington, Del., under the trademark HYLENE® W. A variety of polyols can be used in the preparation of the polyurethane, as is well known in the art, but the best mechanical properties are obtained with a mixture of poly($\epsilon$-caprolactone) glycol, 1,4-butanediol, and trimethylolpropane in which poly($\epsilon$-caprolactone) glycol is contained in a weight proportion of about 95%, and 1,4-butanediol constitutes a major portion of the remaining polyols. The poly($\epsilon$-caprolactone) glycol preferably should have its number average molecular weight in the range of 1,100 to 1,400. This glycol can be commercially obtained from various sources, including Union Carbide Corporation, which offers it under the designation "Niax" caprolactone polyol PCP-0230. Both 1,4-butanediol and trimethylolpropane are commercially available from several sources.

Other polyols that may be used in the compositions of this invention include, for example, various glycols having number average molecular weights in the range of about 500–5,000, especially polyalkylene ether glycols and polyester glycols of the type commonly used in polyurethane manufacture. Poly($\epsilon$-caprolactone) glycol is a polyester glycol made by the polymerization of $\epsilon$-caprolactone in the presence of a glycol, for example, ethylene glycol. Other polyester glycols are obtained from dicarboxylic acids or their lower esters or halides and organic diols. The preferred polyalkylene ether glycols have 2–10 carbons atoms in their repeating units. Typical glycols include polyethylene ether glycol, polypropylene ether glycol, polytrimethylene ether glycol, polypentamethylene ether glycol, and similar glycols.

When poly($\epsilon$-caprolactone) glycol, 1,4-butanediol, and trimethylolpropane are used, the best balance of physical properties of the resulting polyurethane is obtained when the weight proportions of the polyurethane components are as follows: PICM, 27.6%; poly($\epsilon$-caprolactone) glycol, 62.6%; 1,4-butanediol, 3,5%; and trimethylolpropane, 0.7%. These compositions also must contain a polycondensation catalyst, which catalyzes the reaction of PICM with the various polyols employed in the polyurethane preparation. A suitable catalyst is, among others, an organotin compound or a stannous salt of an organic acid. Such polyurethane catalysts are well known and commonly used. In the practical operation of this invention, the polyols PICM, and any other ingredients are well blended at an elevated temperature. The catalyst then is added and heating is continued for a short while, while efficient agitation is maintained. The resulting polyurethane composition can be poured or painted onto the substrate.

The adduct of an aliphatic diisocyanate with N-(t-butyl)diethanolamine can be made following the procedure of U.S. Pat. No. 3,555,115 to Bottomley and Hunt. In that patent N-(t-butyl)diethanolamine is named 3-t-butyl-3-aza-1,5-pentanediol. All aliphatic diisocyanates enumerated in the above patent, especially in column 2, lines 61–72, are suitable for making adducts that can be used in the compositions of the present invention. For the purpose of this disclosure, the entire specification of U.S. Pat. No. 3,555,115 is incorporated herein by reference. The preferred adducts are those formed from N-(t-butyl)diethanolamine and PICM or 3-isocyanatomethyl-3,5,5-trimethylcyclohexyl isocyanate (usually known in the polyurethane industry as isophorone diisocyanate). In practice, the adducts are conveniently made by refluxing an appropriate diisocyanate and N-(t-butyl)diethanolamine in respective molar proportions of 1:2 in a volatile organic solvent (for example, methylene chloride or acetone) until the infrared spectrum of the solution no longer has an isocyanate group peak at 4.45$\mu$. The product is isolated by evaporation of the solvent. About 0.5–2 parts by weight of these adducts per 100 parts of PICM-derived polyurethane are used in compositions of this invention.

It has been found that when such an adduct and bis(2,2',6,6'-tetramethyl-4-piperidine) sebacate are both present in the polyurethane compositions of the type contemplated by the present invention, the cured polyurethane has excellent physical properties, light stability, and resistance to contact staining. Bis(2,2',6,6'-tetramethyl-4-piperidine) sebacate is a commercial light stabilizer available from Ciba-Geigy Corporation, Ardsley, N.Y., under the trade name "Tinuvin" 770. For best results it is recommended that about 3 parts by weight of "Tinuvin" 770 be used, together with about 1 part of adduct of an aliphatic diisocyanate with N-(t-butyl)diethanolamine per 100 parts of PICM-derived polyurethane.

While one of the main applications of the polyurethane compositions of this invention is in white tire sidewalls, compositions containing pigments of other colors can also be prepared. Most inorganic pigments dispersed in the polyurethane composition by a conventional technique provide good hiding at a level of about 0.5–3 parts per 100 parts polymer solids. When carbon black is used, 0.5 part by weight is sufficient. Soluble colorants, such as, for example, "Microlith" K of Ciba-Geigy Corporation, can be dispersed in the compositions of the present invention in low-shear mixing equipment. All the pigmented polyurethane compositions of the present invention give cured polyurethane elastomer that is highly resistant to contact staining.

As an additional improvement, it has been found that both the physical properties of the white polyurethane elastomer and improved receptiveness to adhesives are obtained when a white-pigmented epoxy paste containing about 60% of titanium dioxide is used instead of titanium dioxide alone. Such paste is commercially available from Ferro Co., Cleveland, Ohio, under the trade name "Ferro-White" V-35000. In the presence of about 3 parts by weight per 100 parts of polyurethane solids of "Tinuvin" 770, the amount of "Ferro-White" V-35000 white pigment should be within the range of about 0.4–2.4 parts per 100.

The compositions of the present invention can be conveniently applied to automobile tires which are molded with a concentric groove in one of its sidewalls. The groove is painted at about 100° C. with an adhesive solution, usually about 25% of toluene diisocyanate in methylene chloride, while the tire is rotated on a turntable. While the liquid polyurethane composition is tack-free in a matter of a few minutes at 100° C., full cure is obtained at this temperature in about one hour.

This invention is now illustrated by the following examples of certain preferred embodiments thereof, wherein all parts, proportions, and percentages are by weight unless otherwise indicated.

EXAMPLE 1

PREPARATION OF WHITE SIDEWALL COMPOSITION

To a mixture of 41.66 g (0.159 mol) "Hylene" W, 94.5 g (0.075 mol) "Niax" caprolactone polyol PCP-0230, and 5.34 g (0.059 mol) 1,4-butanediol in a stirred cylindrical flask reactor equipped with an internal thermometer and maintained under a nitrogen atmosphere there was added a mixture of 1.08 g (0.008 mol) trimethylolpropane, 2.40 g (1.62%) "Ferro-White" V-35000, 4.50 g (3%) "Tinuvin" 770 and 1.48 g (1%) PICM adduct with N-(t-butyl)diethanolamine. The mixture was heated during the addition and heating was continued until the temperature reached 90° C. The stirring means was removed from the liquid and the mixture was degassed at a gradually decreasing pressure. When the temperature reached 75°–80° C., nitrogen was again introduced. Stirring at normal pressure was resumed and, when the temperature decreased to 70° C., one drop (~0.05 g) of a 50% solution of stannous dilaurate catalyst in isooctane was added. The mixture was vigorously stirred, first at normal pressure, and then in vacuum. When the temperature increased to 78°–80° C., normal pressure was restored. The polyurethane composition was ready for use (pot life 1.5 min.).

EXAMPLE 2

APPLICATION OF WHITE SIDEWALL COMPOSITION TO TIRE

A proprietary sodium hypochlorite solution in organic solvents sold under the name Satreat ® by American Finish & Chemical Company, Chelsea, Mass. was brushed onto a molded 2 mm deep and 2.5 cm wide sidewall groove of a tire. Volatile materials were evaporated by heating at 100° C. A 25% solution of toluene diisocyanate in methylene chloride was then applied in the same manner. The polyurethane composition of Example 1 was quickly poured into the pretreated groove while the tire was rotated on its side. The polyurethane was then cured for one hour at 100° C. The resulting white tire sidewall was resistant to contact staining.

EXAMPLE 3

Following the general technique of Example 1, polyurethane compositions based on the same polyurethane components but varying additives were prepared. The physical properties of the polyurethanes cured at 100° C. for one hour were determined and are summarized below in Table I. Likewise, adhesion of the polyurethanes to cured sidewall rubber was determined according to a peel adhesion test on an Instron tester at room temperature.

For this test a 2 mm×2.5 cm×13.5 cm depression is molded into a 6 mm thick sidewall rubber slab. The slab is cured in a press at a total pressure of 69 MPa at 160° C. for 25 minutes. The molded sample is coated with adhesive as described above for the tire. After all volatiles have been evaporated, the fluid white polyurethane mix is cast into the depression and allowed to cure at 100° C. for one hour. The protective sides are trimmed off from the cured samples and only the black and white rubber sections are submitted for peel adhesion tests after one day. The strips are pulled at room temperature on an Instron tester at a rate of 5 cm per minute, and the adhesion is reported in MPa's.

TABLE I

| | Stress-Strain (ASTM-D412) | | | | Adhesion | |
|---|---|---|---|---|---|---|
| Additive | Modulus $M_{300}$, MPa | Tensile Strength MPa | Elongation at Break, % | Permanent Set, % | MPa | Rating 1–5 1 = no Adhesion |
| "Tinuvin" 770 (3%) | 7.4 | 20.0 | 470 | 3 | 0.4 | 5 |
| PICM/N-(t-butyl)diethanolamine | 7.9 | 17.9 | 580 | 5 | 0.2 | 3 |

TABLE I-continued

| Additive | Stress-Strain (ASTM-D412) | | | Adhesion | |
| --- | --- | --- | --- | --- | --- |
| | Modulus M₃₀₀, MPa | Tensile Strength MPa | Elongation at Break, % | Permanent Set, % | MPa | Rating 1-5 1 = no Adhesion |
| adduct (3%) "Tinuvin" 770 (3%) + PICM/N-(t-butyl)diethanolamine adduct (1%) | 7.3 | 40.3 | 535 | 4 | 0.6 | 5 |
| N-t-butyl) diethanolamine (1%) + "Tinuvin" 770 (3%) | 6.9 | 29.0 | 490 | 4 | 0.3 | 5 |
| N-(t-butyl) diethanolamine (1%) | 6.2 | 14.0 | 580 | 7 | 0.2 | 1 |

EXAMPLE 4

The whitewall compositions of the present invention cure to polyurethane elastomers having very good aging properties, as is shown below.

A white sidewall polyurethane composition was prepared according to the technique of Example 1 using the same starting materials, except that titanium dioxide, 2.4 g (1.62%), was used instead of "Ferro-White" V-35000 and the proportion of "Tinuvin" 770 was reduced to 2.88 g (1.95%). The composition was cured for one hour at 100° C.

The initial stress-strain properties, determined according to ASTM D412, were as follows:

| Modulus, M₃₀₀ | 6.2 MPa |
| --- | --- |
| Tensile Strength at Break | 20.0 MPa |
| Elongation at Break | 600.0 % |

This composition was aged for seven to ten days at temperatures from −80° C. to 109° C. The stress-strain data for the aged samples are given in Table II, below:

TABLE II

| Aged 7-10 Days at Temperature | Modulus, 300% (MPa) | Tensile Strength (MPa) | Elongation At Break, % |
| --- | --- | --- | --- |
| −80° C. | 6.4 | 14.8 | 570 |
| −40° C. | 6.2 | 14.8 | 600 |
| −14° C. | 6.2 | 17.2 | 600 |
| 4° C. | 6.4 | 15.5 | 560 |
| 21° C. | 5.5 | 16.9 | 590 |
| 51° C. | 5.5 | 23.8 | 500 |
| 81° C. | 4.5 | 25.2 | 500 |
| 109° C. | 3.8 | 13.8 | 560 |

EXAMPLE 5

A white sidewall polyurethane was prepared according to the techique of Example 1, using the same starting materials, except that the 1.48 g (1%) PICM adduct with N-(t-butyl)diethanolamine was replaced with 1.48 g (1%) of an adduct of 3-isocyanatomethyl-3,5,5-trimethylcyclohexyl isocyanate with N-(t-butyl)diethanolamine. The composition had the following physical properties after 1 hour cure at 100° C.: Modulus (300%), 7.9 MPa; Tensile Strength at Break, 42.7 MPa; Permanent Set, 3%; Elongation at Break, 480%.

I claim:

1. A composition consisting essentially of a polyurethane made from 4,4'-methylenebis(cyclohexyl isocyanate) and one or more polyols in such proportions that the total amounts of isocyanate and hydroxyl functionalities are about equal, an adduct of 2 moles of N-(t-butyl)diethanolamine with 1 mole of an aliphatic diisocyanate, and bis (2,2'6,6'-tetramethyl-4-piperidine) sebacate.

2. A composition of claim 1 wherein the aliphatic diisocyanate used to form an adduct with N-(t-butyl)-diethanolamine is 4,4'-methylenebis(cyclohexyl isocyanate) or 3-isocyanatomethyl-3,5,5-trimethylcyclohexyl isocyanate.

3. A composition of claim 2 wherein the aliphatic diisocyanate is 4,4'-methylenebis(cyclohexyl isocyanate).

4. A composition of claim 3 wherein the polyurethane is obtained from 4,4'-methylenebis(cyclohexyl isocyanate) and a polyol mixture consisting of poly(ε-caprolactone)glycol, 4,4-butanediol, and trimethylolpropane in which poly(ε-caprolactone) glycol constitutes about 95 weight percent of the polyol mixture, and 1,4-butanediol constitutes a major portion of the remaining polyols.

5. A composition of claim 4 wherein the approximate weight proportions of the polyurethane components are as follows: 4,4'-methylenebis(cyclohexyl isocyanate) 27.6%, poly(ε-caprolactone) glycol 62.6%, 1,4-butanediol 3.5%, and trimethylolpropane 0.7%.

6. A composition of claim 4 wherein the number average molecular weight of the poly(ε-caprolactone) glycol is 1,100 to 1,400.

7. A composition of claim 4 containing a dispersed inorganic pigment in sufficient concentration to provide good hiding.

8. A composition of claim 7 wherein the proportion of pigment is about 0.5-3 parts per 100 parts by weight of polymer solids.

9. A composition of claim 1 containing a dispersed organic colorant.

10. A composition of claim 1 wherein the respective proportions of bis(2,2',6,6'-tetramethyl-4-piperidine) sebacate and of adduct of 2 moles of N-(t-butyl)diethanolamine with 1 mole of an aliphatic diisocyanate are approximately 3 parts and 1 part per 100 parts by weight of the polyurethane.

11. A white sidewall tire composition consisting essentially of a composition of claim 1 and a white-pigmented epoxy paste containing about 60 weight percent of titanium dioxide, the proportion of the epoxy paste being about 0.4-2.4 parts by weight per 100 parts of polyurethane, while the proportion of bis(2,2',6,6'-tetramethyl-4-piperidine) sebacate is about 3 parts by weight.

12. A method of making an automobile tire having a colored sidewall, said method comprising:
(1) fabricating a tire having a concentric groove on at least one of its sidewalls;
(2) cleaning the sidewall groove;
(3) applying an adhesive to the sidewall groove;
(4) applying to the sidewall groove a composition consisting essentially of a polyurethane made from 4,4'-methylenebis(cyclohexyl isocyanate) and one or more polyols in such proportions that the total amounts of isocyanate and hydroxyl functionalities are about equal, an adduct of 2 moles of N-(t-butyl)diethanolamine with 1 mole of an aliphatic diisocyanate, and bis(2,2',6,6'-tetramethyl-4-piperidine) sebacate; said composition containing in addition a pigment or colorant; and (5) heat-curing said composition.

13. The method of claim 12 wherein the polyurethane is made from 4,4'-methylenebis(cyclohexyl isocyanate) and a polyol mixture consisting of poly(ε-caprolactone) glycol, 1,4-butanediol, and trimethylolpropane in which poly(ε-caprolactone) glycol consistutes about 95 weight percent of the polyol mixture, and 1,4-butanediol constitutes a major portion of the remaining polyols.

14. The method of claim 12 wherein the aliphatic diisocyanate which is used to make an adduct with N-(t-butyl)diethanolamine is 4,4'-methylenebis(cyclohexyl isocyanate) or 3-isocyanatomethyl-3,5,5-trimethylcyclohexyl isocyanate.

* * * * *